No. 658,412. Patented Sept. 25, 1900.
G. M. WESTMAN.
METHOD OF TREATING ORES.
(Application filed Jan. 12, 1899.)

(No Model.)

Witnesses
Inventor
Gustaf M. Westman
By his Attorney
Charles A. Perry

UNITED STATES PATENT OFFICE.

GUSTAF M. WESTMAN, OF NEW YORK, N. Y., ASSIGNOR TO THE ARSENICAL GOLD REDUCTION COMPANY, OF NEWARK, NEW JERSEY.

METHOD OF TREATING ORES.

SPECIFICATION forming part of Letters Patent No. 658,412, dated September 25, 1900.

Application filed January 12, 1899. Serial No. 701,903. (No specimens.)

*To all whom it may concern:*

Be it known that I, GUSTAF M. WESTMAN, a subject of the King of Sweden and Norway, residing in the city, county, and State of New York, have invented certain new and useful Improvements in Methods of Treating Ores, of which the following is a specification.

My invention relates to the class of processes employed in the reduction of ores, the object being to provide a practicable and economical process of treating arsenic ores particularly and collecting the arsenic and also saving any precious metals which may be contained in the ores operated upon. The baser metals may also be reduced and saved if present in sufficient quantities to warrant it.

The treatment of arsenic ores in considerable quantities has usually been found extremely difficult and dangerous, owing to the poisonous qualities of the arsenic vapors, and any usual process of treatment involves heating in more or less open furnaces and much of the arsenic vapor escapes into the air. Such processes can therefore be carried on only in uninhabited districts. By my invention the freeing of the arsenic from the ore is accomplished in a closed chamber, from which the vapors are led off into a suitable condenser. At the same time the precious metals, which are usually present in more or less abundance, may be collected and saved. The heating and melting are accomplished by means of electric currents in the same general manner as proposed in a patent heretofore granted to me, No. 577,802; but certain improvements which I have devised in the method of applying the electric currents, as well as in the construction and organization of the electrodes, render the process herein set forth much more economical and effective.

Figure 1:
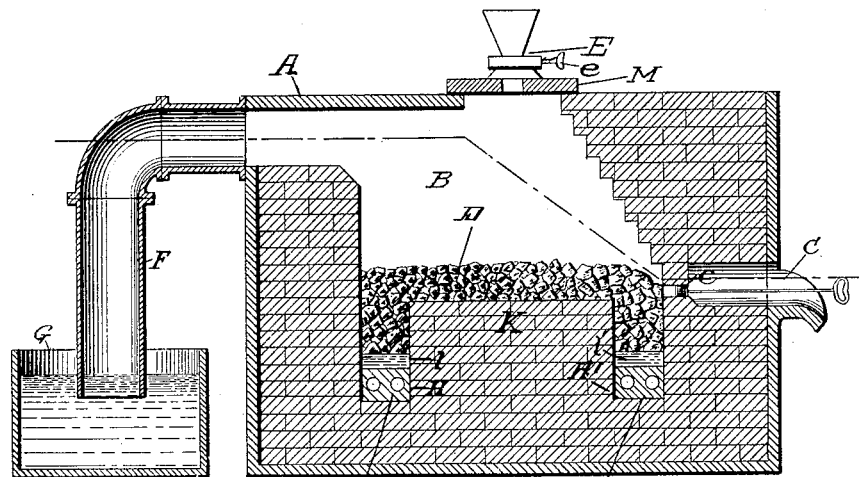
Figure 2:
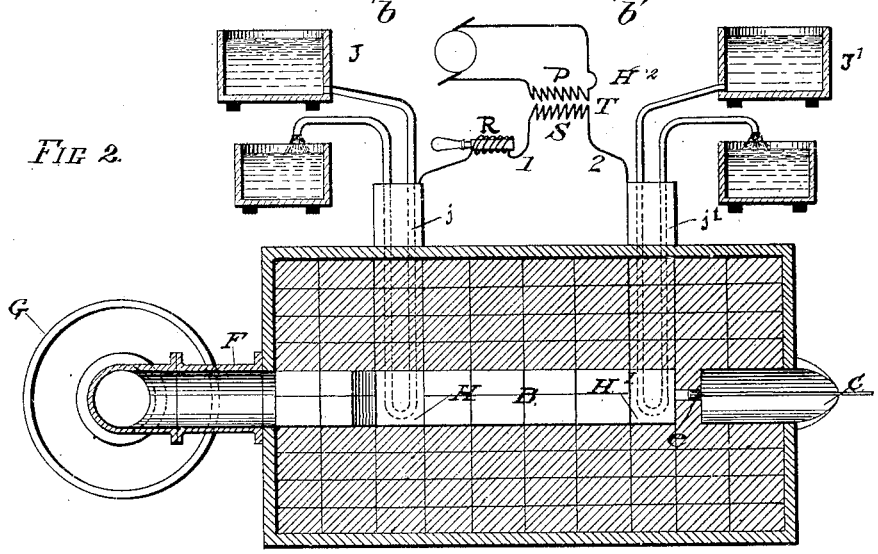

In the accompanying drawings, Figure 1 represents a vertical section of a furnace for carrying my process into operation, and Fig. 2 represents a horizontal section of the same.

Referring to the drawings, A represents the wall of the furnace, and B the melting-chamber. Two electrodes H and H' extend through the furnace-walls into the bottom of the chamber B. These electrodes may be of any suitable conducting material; but I usually prefer to use copper with a covering of lead, or iron, which may be used without lead. The upper surfaces of the electrodes H and H' are preferably somewhat below the main floor K of the chamber B, being placed in depressions $b$ $b'$. The electrodes are respectively connected with the terminals of any suitable source of electricity; but for reasons hereinafter pointed out I usually prefer to use alternating currents. In the drawings I have indicated an alternating-current generator at $H^2$, which delivers alternating currents to the primary coil P of an electric converter T. The secondary coil S of this converter is connected by conductors 1 and 2 with the respective electrodes H and H'. The coils of the converter are so proportioned with reference to the electromotive force of the generator as to deliver currents of the required electromotive force and quantity to the furnace. It is not always essential that alternating electric currents be employed; but they possess the advantages of ready production and convenient control and freedom from electrolytic effects, whereas with continuous currents there would be a tendency to reduce one of the electrodes and build up the other by electrolytic action. Moreover, continuous currents tend to break up the chemical combinations of the baser metals in the matte, and hence consume much of the energy uselessly.

The ore D is fed into the furnace through a suitable hopper E, which may be closed tightly by a slide or cover $e$ to prevent the escape of the vapors of arsenic when the furnace is in operation. The circuit for the electric current is completed from one electrode to the other through the mass of ore P. This ore may be any arsenical ore bearing sufficient iron or other metal to afford a conducting-path for the current. An ore which affords a large supply of arsenic and which may be treated with advantage by my process is what is known as "mispickel." The resistance offered by the ore will be sufficiently great to cause sufficient heat to be generated therein to melt it and to thereby liberate the arsenic, which then passes in the form of metallic vapor through the pipe F into a condenser G of any suitable character. In the drawings I have shown a tank G filled with water. The vapors are condensed thereby, and the metallic arsenic is thus collected. To prevent the electrodes H and H' from melting, they are provided with perforations $j\ j'$, through which circulate streams of water from suitable sources J J'. It is usually desirable to insulate the sources J J' from each other, as otherwise the pipes conveying the water might afford a short circuit between the electrodes. The water may be derived from a single hydrant through sections of rubber hose or other non-conducting material. The constant circulation of the water keeps the electrodes sufficiently cool, and thus prevents the loss of current in the electrodes, such as otherwise might result from increased resistance offered thereby when heated to a very high temperature. The melted ore freed from the arsenic may be drawn off through one or more taps C, which may be opened and closed by a plug $c$, as desired.

Much of the heavy precious metals, such as gold and silver, sink downward and gather in the depressions above the electrodes, and I have found it useful in some instances to employ a layer of lead, as indicated at $l\ l'$, upon the surfaces of the copper electrodes to gather the precious metals. The lead will usually be in a molten state; but being of greater specific gravity than the mass of ore it will remain at the bottom of the chamber, and owing to the cooling action of the water flowing through the electrodes H and H' it will not be raised to a sufficiently-high temperature to vaporize or distil. Without this cooling action more or less of the lead would usually pass off into the matte. It is not essential that the precious metals be collected within the furnace, as they may be carried off in the matte and afterward recovered therefrom. After the ore has been melted and the arsenic driven off the molten iron, sulfids, or other material composing the matte is drawn off through the tap C, and a new charge is placed in the furnace.

A number of charges may usually be treated before it is necessary to remove the precious metals from the lead in case the latter is employed; but if they are left in the matte they can be recovered in the usual way.

For the purpose of affording convenient access to the furnace it may be provided with a lid M of sufficient size. The walls of the furnace may be of fire-clay or other suitable material; but the portions against which the ore rests should be a non-conductor of electricity.

For the purpose of regulating the electromotive force at the terminals H and H' any suitable regulating device—such, for instance, as an adjustable reactive coil R—may be included in the circuit. Current and pressure indicating devices may be provided for determining the condition of the circuit.

The matte which is withdrawn from the furnace being now freed from arsenic may be readily and safely treated by any suitable process to recover the iron and other metals which it may contain.

I claim as my invention—

1. The process of treating arsenical ores which consists in melting the ores by the passage of electric currents therethrough, thereby vaporizing the arsenic, cooling portions of the electrodes maintaining portions of the electrodes intervening between the ore and the cooled portions in a melted condition and collecting the precious metals in such melted portions.

2. The process of treating arsenical ores which consists in melting the ores by the passage of electric currents therethrough, thereby vaporizing the arsenic, maintaining portions of the electrodes relatively cool, collecting the precious metals in melted conducting material at the bottom of the melting-chamber and withdrawing the precious metals with such melted material.

Signed by me at New York, N. Y., this 10th day of January, 1899.

GUSTAF M. WESTMAN.

Witnesses:
L. C. CARUANA,
J. H. JONES.